(12) United States Patent
Soditch et al.

(10) Patent No.: US 7,658,447 B2
(45) Date of Patent: Feb. 9, 2010

(54) VEHICLE SEAT WITH AUTO-FOLD LEG

(75) Inventors: Milton S. Soditch, Brighton, MI (US);
Sean A. Riley, South Lyon, MI (US);
Vladimir Nastevski, Royal Oak, MI
(US); Douglas A. Siewert, Ann Arbor,
MI (US); Brian Holder, Livonia, MI
(US); Robert A. Wilson, Toledo, OH
(US)

(73) Assignee: Johnson Controls Technology Company, Holland, MI (US)

( * ) Notice: Subject to any disclaimer, the term of this patent is extended or adjusted under 35 U.S.C. 154(b) by 114 days.

(21) Appl. No.: 10/557,832

(22) PCT Filed: Mar. 26, 2004

(86) PCT No.: PCT/US2004/009370
§ 371 (c)(1),
(2), (4) Date: Aug. 25, 2006

(87) PCT Pub. No.: WO2004/106107
PCT Pub. Date: Dec. 9, 2004

(65) Prior Publication Data
US 2006/0284464 A1 Dec. 21, 2006

(51) Int. Cl.
*A47C 1/02* (2006.01)
(52) U.S. Cl. .................................................. 297/335
(58) Field of Classification Search ............... 297/331, 297/332, 333, 334, 335, 336; 296/65.05
See application file for complete search history.

(56) References Cited

U.S. PATENT DOCUMENTS

| 1,876,010 A * | 9/1932 | Kusterle .................. 108/115 |
| 5,641,202 A | 6/1997 | Rus |
| 7,040,702 B2 * | 5/2006 | Yamada et al. ............. 297/331 |

FOREIGN PATENT DOCUMENTS

| DE | 199 43 454 C1 | 1/2001 |
| EP | 1245436 A1 | 10/2002 |
| WO | WO 02/10679 A1 | 12/2002 |

OTHER PUBLICATIONS

International Search Report for PCT/US2004/009370, date of mailing Aug. 30, 2004, 3 pages.

* cited by examiner

*Primary Examiner*—Milton Nelson, Jr.
(74) *Attorney, Agent, or Firm*—Foley & Lardner LLP

(57) ABSTRACT

One embodiment of the invention relates to a vehicle seat (10). The vehicle seat (10) comprises a seat back (14) coupled to a vehicle (5) by a base bracket (26) or directly to the vehicle. A seat base (12) is coupled to the seat back and configured to rotate from a seating position (18) to a stored position (20). A leg assembly (40) is coupled to the seat base (12) and configured to rotate from a deployed position to a retracted position. An indicator (50) is coupled to the seat base (12) to indicate a predetermined condition of the seat base.

16 Claims, 5 Drawing Sheets

VEHICLE SEAT WITH AUTO-FOLD LEG

CROSS-REFERENCE TO RELATED APPLICATIONS

This application claims priority benefit to International Application No. PCT/US2004/009370 filed on Mar. 26, 2004 and published in English under the PCT, and U.S. application Ser. No. 10/444,433, filed May 23, 2003, now U.S. Pat. No. 6,742,841, issued Jun. 1, 2004 all of which are incorporated herein by this reference.

BACKGROUND OF THE INVENTION

The present invention relates generally to the field of vehicle seats and more particularly relates to a vehicle seat having automatic folding legs.

It is known to provide a vehicle seat, for example, an automotive seat having a reclineable back. It is also known to provide a vehicle seat having a reclineable back and an independently movable seat base. It is also known to provide a vehicle seat having a movable seat base that pivots to an upright position. It is also known to provide a vehicle seat having an adjustable lumbar consisting of a flexible member having a first end anchored and a second end moved with respect to the first end to cause the flexible member to vary its shape to provide adjustable support within the lumbar region of an automotive seat.

Notwithstanding the known devices, there remains a significant need to develop a vehicle seat having a seat base which is capable of pivoting to an upright position with a one-hand operation of a user. Further, there remains a need to provide a vehicle seat that includes an automatic folding leg assembly. Further, there remains a need to provide a vehicle seat having an indicator to notify a user of a predetermined condition of the seat base.

It is desirable to provide a vehicle seat that provides one or more of these or other advantageous features. Other features and advantages will be made apparent from the present description.

SUMMARY OF THE INVENTION

One embodiment of the invention relates to a vehicle seat. The vehicle seat comprises a seat back configured to be coupled to a vehicle. A seat base is positioned with respect to the seat back. The seat base has a front portion and a rear portion. The seat base is configured to move from a seating position wherein an occupant can be seated in the seat to a stored position wherein the seat base is moved closer to a position substantially aligned with the seat back and the front portion of seat base is positioned higher than the rear portion of the seat base. A leg member comprising a single U-shaped tube, with the leg member having a first leg portion connected to the seat base, a second leg portion connected to the seat base and a middle portion configured to be supported on the floor of the vehicle. The leg member has a deployed position corresponding with the seating position wherein the leg member supports the seat base and the leg member also has a retractable position corresponding to the stored position wherein the leg member is folded close to the seat base. A cable has a first end connected to the leg member for rotating the leg member from the deployed position toward the retracted position when the seat base is moved from the seating position toward the stored position. A cable protection mechanism is connected to the cable such that when the seat base is locked in the stored position and the leg member is pulled, the leg member will move without damaging the cable.

There is also provided a seat for use in a second row of seats in a vehicle. The seat has at least one side and a storage area below the seat. The seat comprises a seat back configured to be mounted in the vehicle and a seat base configured to be mounted in the vehicle. The seat base has a front portion, a rear portion and a side portion extending between the front portion and the rear portion. The seat base is configured to rotate from a seating position, wherein an occupant can be seated, to a stored position wherein the seat base is closer to the seat back and the front portion of the seat base is positioned above the rear portion of the seat base. A leg assembly including a leg member comprising a U-shaped tube, with the leg member having a first leg portion connected to the seat base, a second leg portion connected to the seat base and a middle portion extending between the first and second leg portions. The leg assembly is moveable between a deployed position corresponding with the seating position and a retracted position corresponding to the stored position. A cable having a first end is connected to the leg assembly and a second end is secured such that movement of the seat base causes the cable to move the leg member to the retracted position. A biasing member is connected between the leg assembly and the seat base. The biasing member is for biasing the leg member toward the deployed position. When the seat is in the seating position and the leg member is in the deployed position to support the seat base, the side of the seat is open to allow access to the storage area below the seat base.

There is further provided a seat for a vehicle. The seat comprises a seat back configured to be mounted in the vehicle. The seat base has a front portion and a rear portion. The seat base is configured to rotate from the seating position, wherein an occupant can be seated, to a stored position wherein the seat base is positioned substantially aligned with the seat back and the front portion of the seat base is positioned higher than the rear portion of the seat base. A leg assembly including a leg member is connected to the seat base. A cable having a first end is connected to the leg assembly and a second end is secured such that when the seat base moves from the seating position to the stored position, the movement of the seat base causes the cable to move the leg member to the retracted position. A biasing member is connected between the leg assembly and the seat base with the biasing member biasing the leg member toward the deploy position. A mechanism is connected to the cable such that when the seat base is locked in the stored position and the leg member is pulled, the leg member moves without damaging the cable.

There is additionally provided a seat for use in a second row of seats in a vehicle. The seat has at least one side and a storage area below the seat. The seat comprises a seat back configured to be coupled to the vehicle. A seat base is configured to be coupled to the vehicle. The seat base has a front portion, a rear portion and a side portion extending between the front portion and the rear portion. The seat base is configured to rotate from a seating position, wherein an occupant can be seated, to a stored position wherein the seat base is positioned substantially aligned with the seat back and the front portion of the seat base is positioned higher than the rear portion of the seat base. A leg assembly including a leg member comprises a single U-shaped tube. The leg member has a first leg portion connected to the seat base, a second leg portion connected to the seat base and a middle portion extending between the first and second leg portions. The middle portion is configured to be received in a leg detent located in a floor of the vehicle. A cable having a first end is connected to the leg assembly and a second end is secured such that, when the seat base moves from the seating position to the stored position, the movement of the seat base causes the cable to move the leg member to the retracted position. When the seat is in the seating position and the leg member is extended to support the seat base, the side of the seat is open to allow access to the storage area below the seat base.

In addition, there is provided a seat for a vehicle comprising a seat back configured to be located in the vehicle in a seat base. The seat base has a front portion and a rear portion. The seat base is configured to rotate between a seating position, wherein an occupant can be seated, and a stored position wherein the seat base is positioned substantially aligned with the seat back and the front portion of the seat base is positioned higher than the rear portion of the seat base. A U-shaped leg assembly is connected to the seat base for supporting the seat base in the seating position. A break-away mechanism is connected to the cable such that when the seat base is locked in the stored position and the leg member is pulled, and when a force is applied to the leg assembly, the leg assembly moves toward the deploy position while the seat base remains in the stored position without damaging the cable.

It is further provided a seat for a vehicle with the seat comprising a seat back configured to be located in the vehicle in a seat base having a front portion and a rear portion. The seat base is configured to move between a seating position, wherein an occupant can be seated, and a stored position wherein the seat base is positioned substantially aligned with the seat back and the front portion of the seat base is positioned higher than the rear portion of the seat base. A U-shaped leg assembly is connected with respect to the seat base for supporting the seat base in the seating position. The leg assembly is pivotally connected to the seat base and configured to pivot between a stowed position corresponding to when the seat base is in the stored position and a deployed position corresponding to when the seat base is in the seating position. A leg bracket connected to the seat base and the leg assembly is pivotally connected to the leg bracket. A biasing member is connected between the leg assembly and the seat base, with the biasing member for biasing the leg member toward the deploy position.

DETAILED DESCRIPTION OF THE PREFERRED EMBODIMENTS

Before beginning the detailed description of an exemplary embodiment, several general comments are warranted about the applicability and the scope of the present invention.

First, the illustrations relate to a seat (also can be referred to as a chair) particularly adapted for motor vehicles, such as cars, SUVs, vans, trucks, buses and the like, but the invention is applicable also to seating used in aircraft, railroad vehicles, nautical vehicles or other environments. The illustrated seat is a back seat of a van or SUV and is also referred to as a stadium seat. The seat may be configured as a split seat or a bench-type seat.

Second, the seat of the present invention is illustrated in the FIGURES as a padded seat having certain contours, trim and the like. While this configuration is presently preferred, a wide variety of seat configurations and appearances will benefit from the use of the mechanical support and movement mechanisms. Also the exterior of the seat can be covered by fabric, vinyl, leather or other materials known and used in the seating art.

Third, with regard to the seat described later herein, substantial modifications can be made without departing from the invention's intended scope. For example, while certain mechanical systems are described to move seat components to achieve certain results, other mechanisms, manual or powered, could be substituted therefore. For example, where a screw drive is used in moving the thorax pivot location, other mechanical equivalents including, but not limited to, four bar linkages, air or hydraulic cylinders, air bladders, rack and pinion systems, cams and cables, gears, etc. could be employed. Another example is that for a pelvis support, i.e., a pair of clam-shell like devices (which are themselves already known in the art). They could be replaced by other known or subsequently developed support mechanisms. These mechanisms do not, in and of themselves, form part of the present invention, but when combined with the other pivot, support, rotation and moving mechanisms define the invention and result in more comfortable seating for the occupant.

Figure 1:
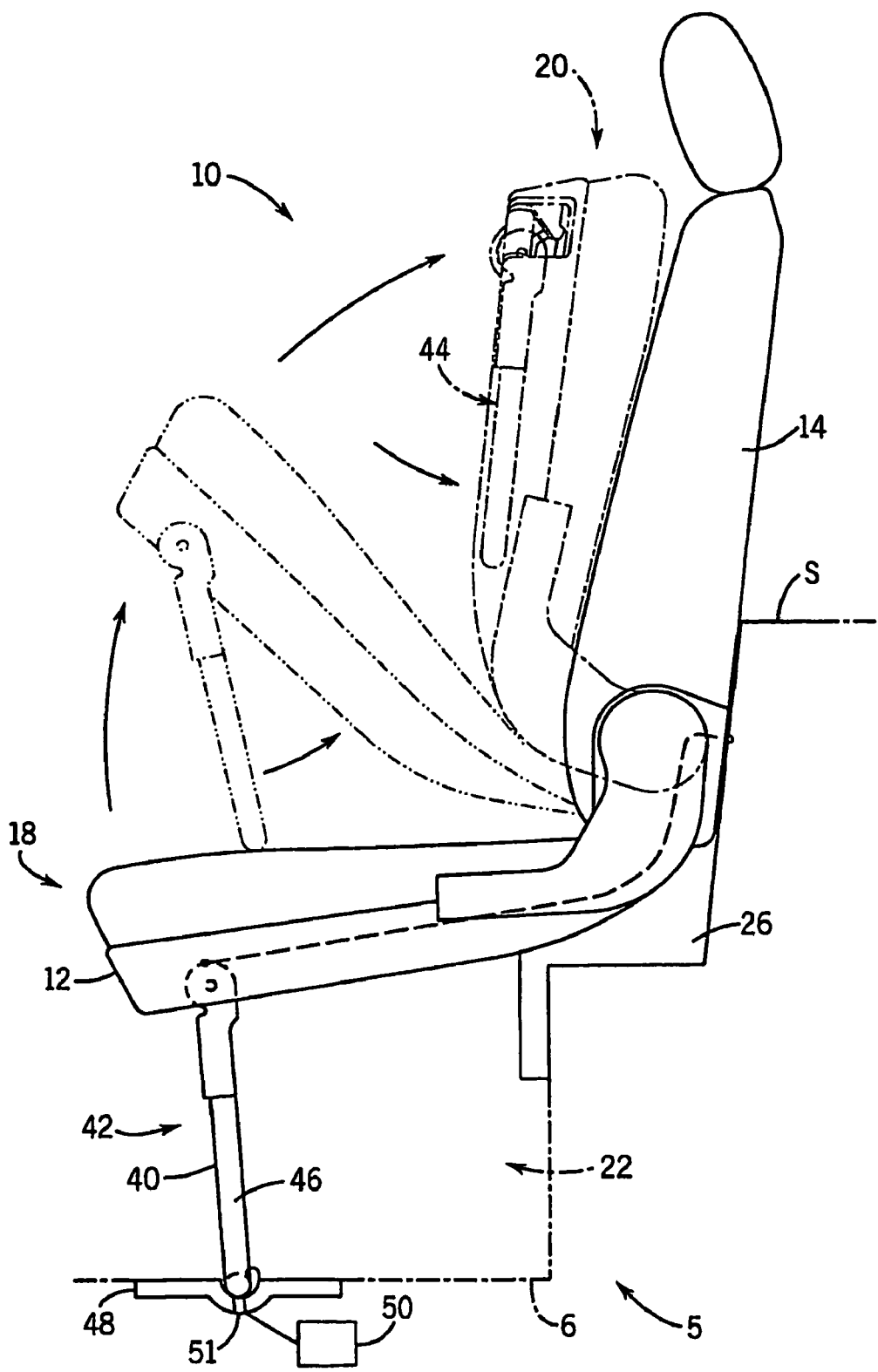
FIG. 1 is a side plan view of an exemplary embodiment of a vehicle seat, illustrating a seating position (solid line), an intermediate position, and a stored position (broken line).

Referring generally to the Figures and in particular to FIG. 1, there is shown a vehicle seat 10 for use in a vehicle 5 of any known type. The vehicle seat 10 includes a seat base 12 which supports a cushioned seat and a seat back 14. Seat base 12 and seat back 14 are independently pivotally connected to a base bracket 26. Such configuration allows an occupant to use a fixed non-movable back or a recline/dump type back. The seat 10 can be either a manually adjustable seat or may be provided with electric motors to provide automated adjustment and electronic control of the seat. Such manipulation can be accomplished by the use of a change of position mechanism coupled to the seat back 14 and seat base 12. It is also contemplated that 2 separate mechanisms may be used to provide flexibility in seat configuration. The change of position mechanism may provide for the back frame to move in proportional relation to the seat base 12 at a predetermined ratio, for example, moving the seat 10 one and a half millimeter per degree of seat back 14 movement if a recliner mechanism is provided. The seat 10 is connected to the floor of the support structure 6 of a vehicle 5 in any of a variety of configurations or designs which allow for the movement and adjustment of the seat 10 within the vehicle 5. The vehicle seat 10 may optionally include a headrest which may also be adjustable with respect to an occupant of the seat 10 such as any known or appropriate headrest.

The seat back 14 and seat base 12 of the vehicle seat 10 preferably includes a cushion 16 and a pair of side bolsters positioned on the sides of the seat back 14. The cushion 16 is preferably contoured to receive and support the body of an occupant of the vehicle seat 10. The side bolsters are also preferably aligned with respect to the cushion 16 and contoured to provide an angled, gradual support of the lateral side portions of an occupant of the vehicle seat 10. The cushion 16 and side bolsters preferably include a foam material (not shown) and a cover of any appropriate or known material such as cloth, vinyl, leather, etc. The cushion 16 and bolsters include support frames as more fully described below.

The seat back 14 further includes a back frame including a cover of any appropriate or known material such as cloth, vinyl, leather, etc. and which preferably matches the cover material of the cushion 16, side bolsters and seat base 12. However, it should be understood that a different material may be used on any element.

Referring now to FIGS. 1-9, there is provided a seat 10 for a vehicle 5. The seat 10 comprises a seat back 14 coupled to the vehicle 5. A seat base 12 and seat back 14 are coupled to the base bracket 26 and with the seat base 12 configured to rotate from a seating position 18 to a stored position 20. The seat back 14 is coupled by the base bracket 26 which is attached to the vehicle support structure 6 of the vehicle 5. A link bracket 28 is pivotably connected to the base bracket 26 by a suitable pivot pin. The base bracket 26 and the link bracket 28 can be composed of any suitable material such as metal (steel for example) or an engineered plastic of suitable strength.

Figure 2:
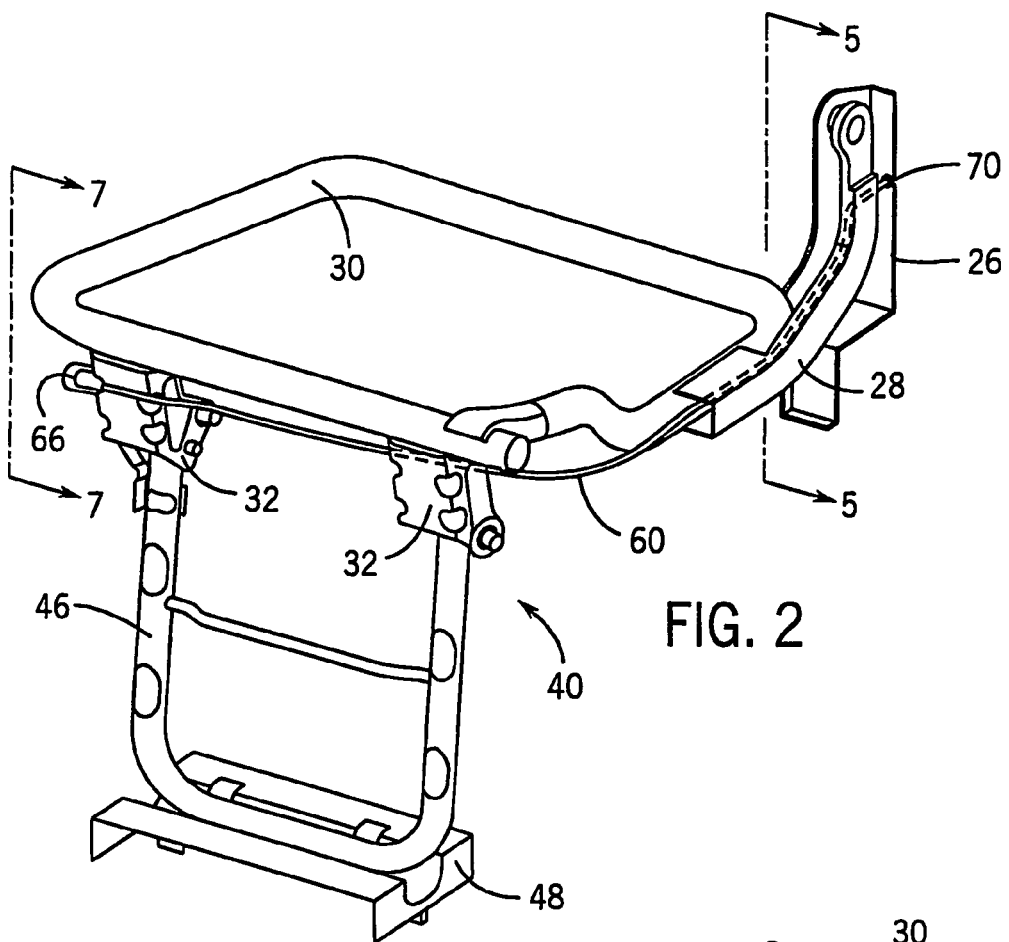
FIG. 2 is a partial perspective view of an exemplary embodiment of a seat, without cushions, illustrating an automatic leg retraction mechanism and leg assembly.

FIG. 2, illustrates a cushion frame 30 without the cushion 16 for clarity purposes. It should be understood that the length and width of the cushion frame 30 can be of any suitable length as determined by the manufacturer of the vehicle seat 10.

Figure 3:
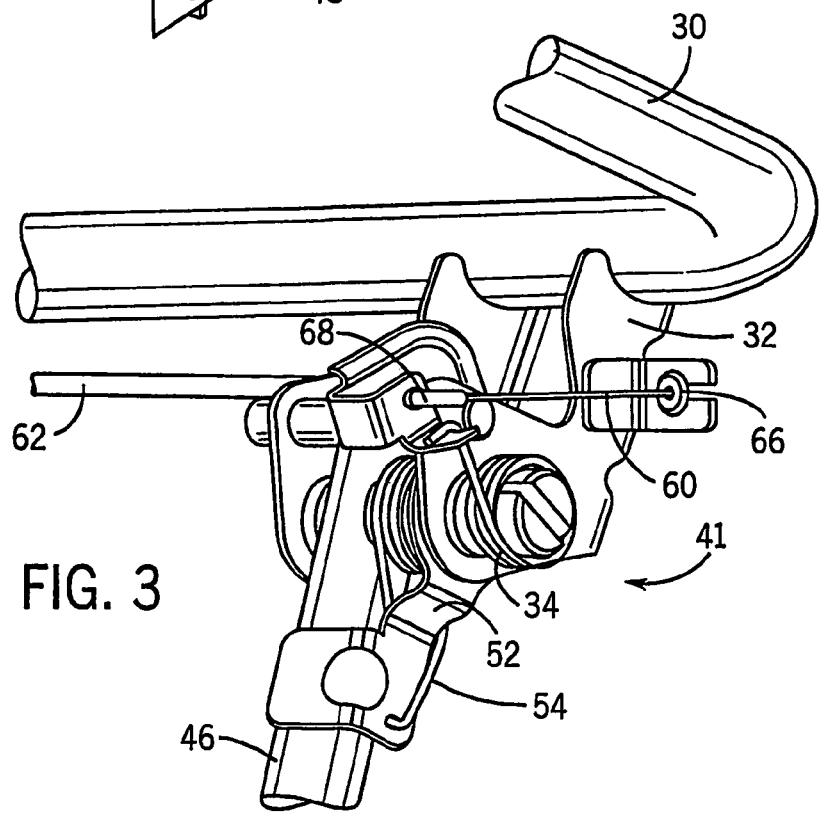
FIG. 3 is a partial perspective rear view of an exemplary embodiment of the leg assembly illustrated in FIG. 2, with a biasing assembly.
Figure 4:
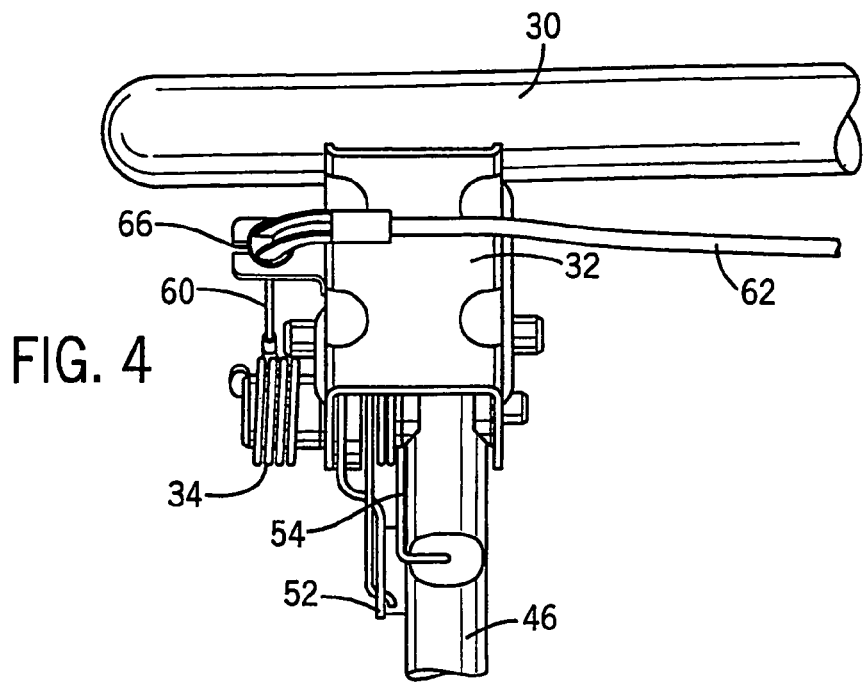
FIG. 4 is a partial perspective front view of the exemplary embodiment of the leg assembly of FIG. 3.
Figure 9:
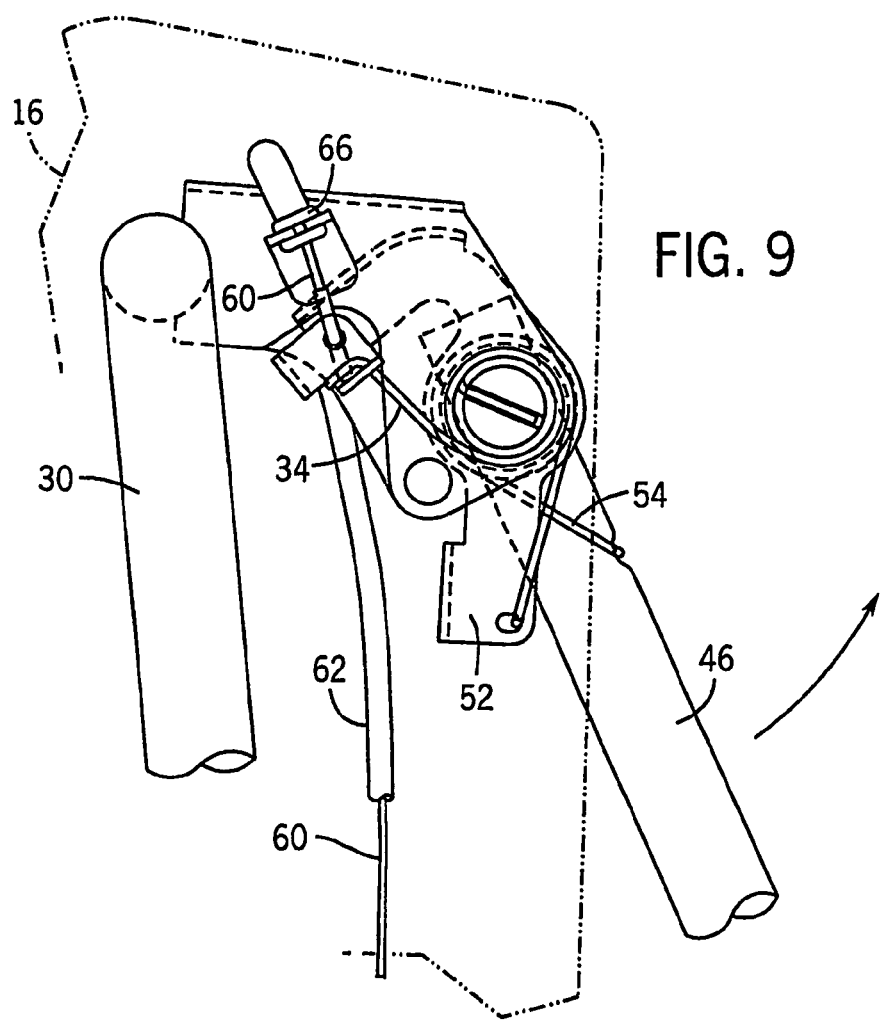
FIG. 9 is a partial view of the seat illustrated in FIG. 8, with the leg member of the leg assembly movable from the seat base without stretching the cable, referred to as a "break-away" feature.

A leg assembly 40 is coupled to the cushion frame 30 by a plurality of cushion brackets 32. The cushion brackets 32 are in a spaced apart relationship and can be fastened to the cushion frame 30 by any suitable means such as bolts, welding, or an adhesive. The cushion brackets 32 can be composed of any suitable material such as metal or an engineered plastic. A leg member 46 is coupled to the cushion frame 30 by the leg assembly 40. (See FIG. 2) The leg member 46 in the leg assembly 40 is configured to rotate from a deployed position 42 to a retracted or stored position 44. (See FIG. 1) The leg assembly 40 includes a leg bracket 52 which is attached to the cushion bracket 32 by a pivot pin. A leg spring 54 biases the leg member 46 towards the leg bracket 52 as seen in FIGS. 3 and 4. The leg spring 54 maintains tension between the leg bracket 52 and the leg member 46 so that the leg member 46 follows the leg bracket 52 and cushion bracket 32 during movement of the seat base 12. The cushion bracket 32 is fixed to the cushion frame 30 and only moves in conjunction with the cushion frame. The illustrated leg member 46 is a single U-shaped tube. It should be understood that the leg member can have any suitable cross-section and may also be configured as two separate leg members operable in unison.

A leg detent 48 is coupled to the vehicle 5. The leg detent 48 typically is located on the vehicle support structure 6 and includes an actuator or sensor 51 which is coupled to an indicator 50. The leg detent 48 may also be a leg catch retainer. (See FIGS. 1 and 2) When the leg assembly 40 is in the deployed position 42, as shown in FIGS. 1 and 2, the leg member 46 engages the leg detent 48 and contacts the actuator 51. A signal is transmitted to the indicator 50 to show that the leg assembly 40 is properly engaged with the leg detent 48. The actuator 51 can be any suitable device such as a micro switch. The indicator 50 can be an electronic or mechanical device that gives a positive indication that the leg assembly 40 is properly engaged with the leg detent 48. The indicator 50 can be, for example, a light on the dashboard of the vehicle 5 or a colored flag associated with the seat 10.

The seat 10 can include an automatic folding capability that is provided by a cable 60 coupled to the seat back 14 and the leg assembly 40. The cable 60 is routed through a cable conduit 62. The cable conduit 62 has a first conduit anchor 64 connected to the link bracket 28 and the second conduit anchor 66 is coupled to the cushion bracket 32. (See FIGS. 2, 3, 5, and 6.) A cable 60 is anchored to the back bracket 26 at a first cable anchor 70 and the other end of the cable 60 is connected to the leg bracket 52 at a second cable anchor 68. (See FIGS. 3, 4, 5 and 7.) A cable 60 is of a predetermined length wherein the cable 60 moves the leg assembly 40 from the deployed position 42 to the retracted position 44 when the seat base 12 is moved from the seating position 18 to the stored position 20 and the leg assembly 40 clears a cargo zone 22 located under at least a portion of the seat base 12. (See FIG. 1.)

Figures 5, 6:
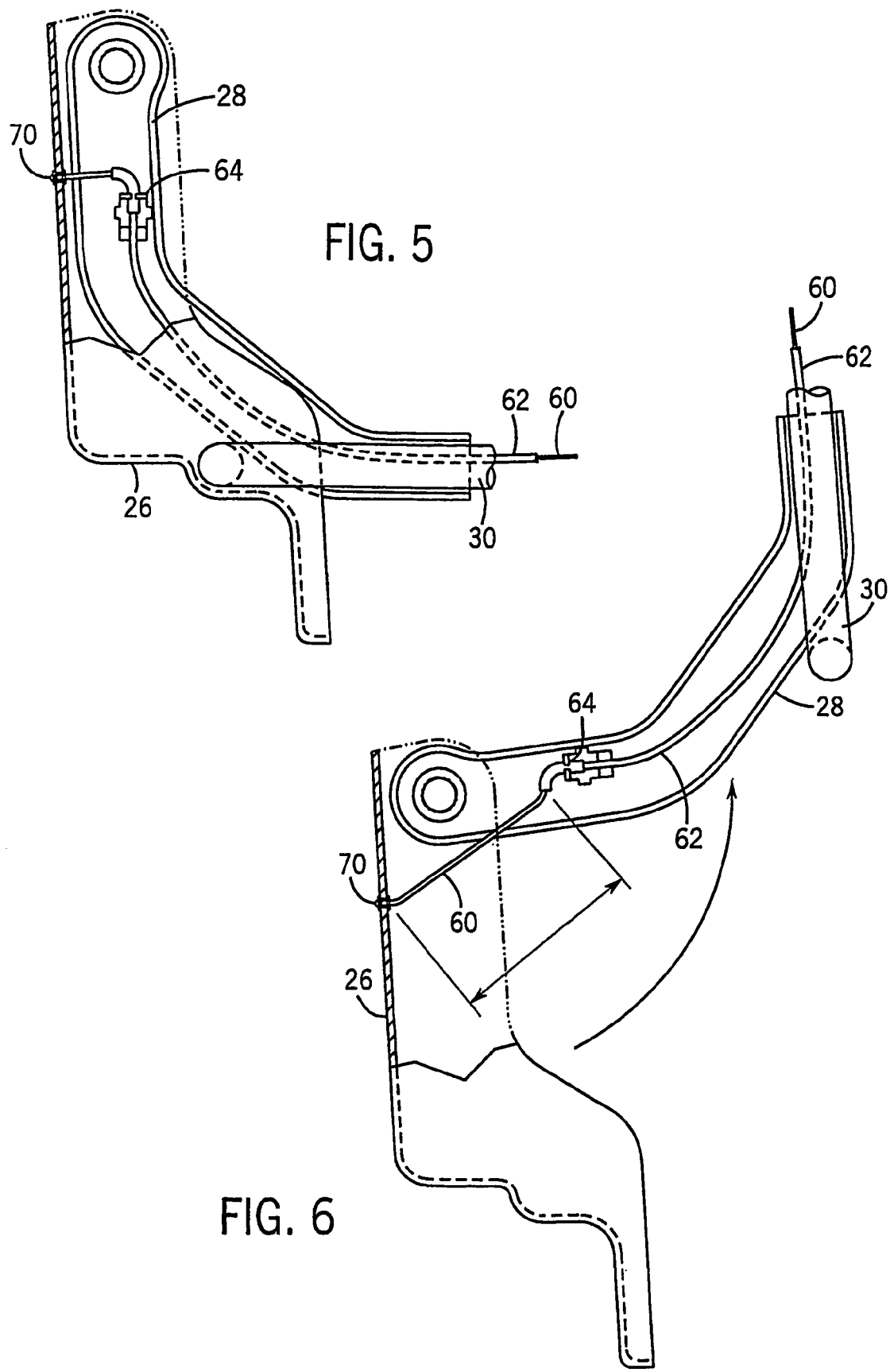
FIG. 5 is a section view along line 5-5 in FIG. 2, illustrating an exemplary embodiment of a cable and cable conduit anchored to a back bracket and a banana bracket, respectively, with the seat in a seating position.
FIG. 6 is a section view of the seat illustrated in FIG. 5, with the seat in the stored position.
Figure 7:
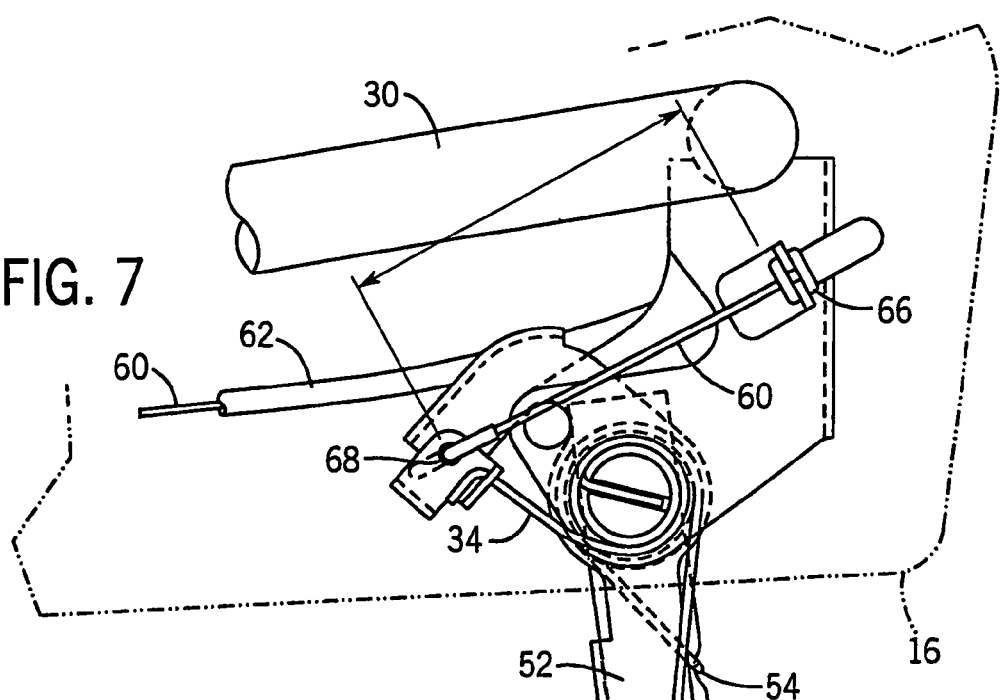
FIG. 7 is a partial view of a seat along line 7-7 in FIG. 2, illustrating a cable and cable conduit anchored to the leg assembly, with the seat (cushion in broken line) in a seating position.
Figure 8:
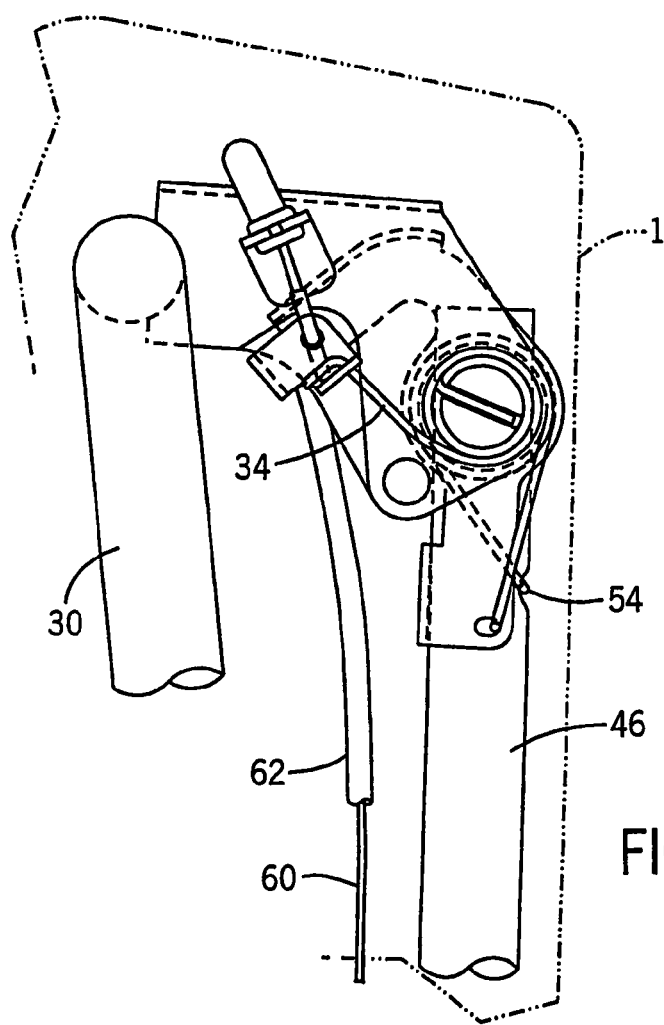
FIG. 8 is a partial view of the seat illustrated in FIG. 7, with the seat (cushion in broken line) in a stored position.

The end of the cable 60 is attached to the base bracket 26 at the cable anchor 70. The cable conduit 62, through which the cable is routed, has a first conduit anchor 64 connected to the link bracket 28 as seen in FIGS. 5 and 6. The other end of the cable 60 is attached to the leg bracket 52 at a second cable anchor 68 (See FIG. 3) and the other end of the conduit 62 is attached to the conduit anchor 66 which is rigidly attached to cushion bracket 32.

When the seat base 12 which includes the cushion 16 and the cushion frame 30 moves to a stored position 20, the cable 60 is pulled because of increasing distance between the attachment point 70 at the base bracket 26 and the conduit end anchor 64 at the link bracket 28 (See FIGS. 5 and 6). That arrangement causes the cable 60 to pull the leg bracket 52 which rotates from the vertical position into a position parallel to the plane of the cushion 16 (See FIGS. 7 and 8). The leg member 46 is connected with a spring to the leg bracket 52 and the spring 54 tension between the bracket and leg causes the leg member 46 to follow the leg bracket 52. As the leg bracket 52 rotates about the pivot pin, the leg member 46 rotates with it around the same pin which forces the leg member 46 into the retracted position 44. (See FIGS. 1, 7 and 8.)

When the seat base 12 is in the stored position 20 and the leg assembly 40 is in the retracted position 44 as shown in FIG. 1, the seat 10 is provided with a "break-away" feature. The break-away feature is provided by attaching the cable 60 to the leg bracket 52 rather than to the leg member 46. When the leg member 46 is pulled while the cushion 16 is in the stored position 20, the cable 60 does not stretch (pull) because it is connected to the leg bracket 52 and not the leg member 46. (See FIG. 9.) When a user pulls on the leg member 46 of the leg assembly 40, the leg member 46 pivots about the pivot pin and pulls against a leg spring 54. The leg spring 54 biases the leg towards the leg bracket 52 as described above.

When the seat base 12 is moved from the stored position 20 to the seating position 18, a leg/cushion spring 34 forces the leg bracket 52 which in turn forces the leg member 46 to rotate forward to the deployed position 42. The leg member 46 follows the leg bracket 52 and the cushion bracket 32 as a result of the tension of the biasing assembly 41. The biasing assembly 41, as described above includes the leg/cushion spring 34 and the leg spring 54. The illustrated springs 34 and 54 are torsion springs mounted on the pivot pin that couples the cushion bracket 32, the leg bracket 52 and the leg member 46, all of which is referred to as the leg assembly 40.

There is also provided a method for automatic retraction of a leg assembly 40 coupled to a vehicle seat 10 mounted in a vehicle 5. The vehicle seat includes the seat back 14 and the seat base 12. The method comprises the steps of providing a cable 60 of a predetermined length. Coupling one end of the cable 60 to the base bracket 26 and coupling the other end of the cable 60 to the leg assembly 40. The leg assembly 40 moves from a deployed position 42 to a retracted position 44 as the seat base 12 is moved from the seating position 18 to a retracted position 20 and the leg assembly 40 clears a cargo zone 22 located under at least a portion of the seat base 12.

Another embodiment of the method includes the step of providing a biasing member 41 coupled to the leg assembly 40 and the seat base 12 and configured to bias the leg assembly 40 from the deployed position 42 to the retracted position 44 to assist the user of the vehicle 10 to move the seat base 12.

The method can also include the step of providing a leg detent 48 coupled to the vehicle 5 and configured to engage the leg assembly 40 when the leg assembly 40 is in the deployed position. An indicator 50 can be coupled to one of the leg detent 48 and the seat base 12 to indicate a predetermined condition of the seat base 12. The indicator includes an actuator 51 mounted in the leg detent 48 and configured to contact the leg assembly 40 when the leg assembly 40 is properly engaged with the leg detent 48. The pre-determined condition can be that the seat 10 is properly deployed and engaged with the leg detent 48 or that the seat 10 is not properly deployed.

The method can also include the step of providing a leg bracket 52 coupled to the leg assembly 40 wherein the leg bracket 52 disengages the leg member 46 from the seat base 12 when a predetermined force on the leg member 46 is exceeded. The predetermined force is the biased tension of the leg spring 54. This allows the user to, as described above, pull the leg member 46 without stretching the cable 60.

Although the disclosed embodiments have been described in some detail, it should be understood that various changes, substitutions and alterations can be made to the embodiments without departing from their spirit and scope.

What is claimed is:

1. A seat for a vehicle, the seat comprising:
a seat back configured to be coupled to the vehicle;
a seat base configured to be coupled to the vehicle, the seat base having a front portion and a rear portion, the seat base configured to rotate from a seating position, wherein an occupant can be seated, and to a stored position wherein the seat base is moved closer to be positioned substantially aligned with the seat back and the front portion of the seat base is positioned higher than the rear portion of the seat base;
a leg assembly including a leg member comprising a single U-shaped tube, the leg member having a first leg portion connected to the seat base, a second leg portion connected to the seat base and a middle portion configured to be received in a leg detent located in a floor of the vehicle;
a cable having a first end connected with respect to the leg member for automatically rotating the leg member from a deployed position to a retracted position when the seat base is moved from the seating position to the stored position; and
a mechanism connected to the cable such that when the seat base is locked in the stored position and the leg member is pulled, the leg member will move without damaging the cable while the seat base remains locked in the stored position.

2. The seat of claim 1, wherein the mechanism is a break-away mechanism including a leg bracket connected between the first leg portion of the leg member and the first end of the cable, the break-away mechanism further comprising a spring for biasing the leg member to engage the leg bracket.

3. The seat of claim 1, wherein the cable has a second end anchored with respect to the seat back and the leg assembly, wherein the cable moves the leg assembly from the deployed position to the retracted position when the seat base is moved from the seating position to the stored position and the leg assembly clears a cargo zone located under at least a portion of the seat base.

4. The seat of claim 1, wherein the cable has a second end secured such that when the seat base moves from the seating position to the stored position, the movement of the seat base causes the cable to move the leg member to the retracted position.

5. A seat for use in a second row of a vehicle, the seat having at least one side and a storage area below the seat, the seat comprising:
a seat back configured to be mounted in the vehicle;
a seat base configured to be mounted in the vehicle, the seat base having a front portion, a rear portion and a side portion extending between the front portion and the rear portion, the seat base configured to rotate from a seating position, wherein an occupant can be seated, and to a stored position wherein the seat base is closer to the seat back and the front portion of the seat base is positioned above the rear portion of the seat base;
a leg assembly including a leg member comprising a U-shaped tube, the leg member having a first leg portion connected to the seat base, a second leg portion connected to the seat base and a middle portion extending between the first and second leg portions, the leg assembly being movable between a deploy position corresponding with the seating position and a retracted position corresponding with the stored position;
a cable having a first end connected to the leg assembly and a second end secured wherein movement of the seat base causes the cable to move the leg member to the retracted position;
a biasing member connected between the leg assembly and the seat base, the biasing member for biasing the leg member toward the deploy position; and
wherein when the seat is in the seating position and the leg member is in the deploy position to support the seat base, the side of the seat is open to allow access to the storage area below the seat base.

6. The seat of claim 5, wherein the biasing member is a spring having a first end connected to the seat base and a second end connected to the leg member.

7. A seat for a vehicle, the seat comprising:
a seat back configured to be mounted in the vehicle;
a seat base configured to be mounted in the vehicle, the seat base having a front portion and a rear portion, the seat base configured to rotate from a seating position, wherein an occupant can be seated, and to a stored position wherein the seat base is positioned substantially aligned with the seat back and the front portion of the seat base is positioned higher than the rear portion of the seat base;

a leg assembly including a leg member connected to the seat base;

a cable having a first end connected to the leg assembly and a second end secured wherein when the seat base moves from the seating position to the stored position the movement of the seat base causes the cable to move the leg member to a retracted position;

a biasing member connected between the leg assembly and the seat base, wherein the biasing member is configured for biasing the leg member toward a deploy position; and a mechanism connected to the cable such that when the seat base is locked in the stored position and the leg member is pulled, the leg member moves without damaging the cable.

8. A seat for a vehicle, the seat comprising:

a seat back configured to be located in the vehicle;

a seat base having a front portion and a rear portion, the seat base configured to rotate between a seating position, wherein an occupant can be seated, and a stored position wherein the seat base is positioned substantially aligned with the seat back and the front portion of the seat base is positioned higher than the rear portion of the seat base;

a U-shaped leg assembly connected to the seat base for supporting the seat base in the seating position; and a break-away mechanism connected to a cable such that when the seat base is locked in the stored position and a leg member of the leg assembly is pulled, when a force is applied to the leg assembly, the leg assembly moves toward a deploy position while the seat base remains locked in the stored position without damaging the cable.

9. A seat for a vehicle, the seat comprising:

a seat back configured to be located in the vehicle;

a seat base having a front portion and a rear portion, the seat base configured to move between a seating position, wherein an occupant can be seated, and a stored position wherein the seat base is positioned substantially aligned with the seat back and the front portion of the seat base is positioned higher than the rear portion of the seat base;

a U-shaped leg assembly connected with respect to the seat base for supporting the seat base in the seating position, the leg assembly pivotally connected to the seat base and configured to pivot between a stowed position corresponding to when the seat base is in the stored position and a deploy position corresponding to when the seat base is in the seating position;

a leg bracket connected to the seat base and the leg assembly pivotally connected to the leg bracket; and a biasing member connected between the leg assembly and the seat base, wherein the biasing member is configured for biasing the leg assembly toward the deploy position.

10. The seat of claim 9, wherein the biasing member is a spring having a first end connected to the seat base and a second end connected to a leg member of the leg assembly.

11. The seat of claim 9, wherein the biasing member is a spring having a first end anchored with respect to the seat base and a second end connected to a leg member of the leg assembly.

12. A seat for mounting in a vehicle, the seat having a seat back, a seat base and a pivotable leg capable of being automatically retracted, the seat comprising:

a cable for automatically retracting the leg wherein a first end of the cable is anchored to a stationary portion of the seat and a second end of the cable is connected to the leg; and a biasing member for biasing the leg in a direction opposite the direction that the cable retracts the leg, wherein the cable is configured so that when the seat base moves from a seating position to a retracted position the leg is automatically retracted by the cable to a position adjacent the seat base.

13. The seat of claim 12 wherein the leg comprises a U-shaped bent tube leg member having first and second ends pivotable with respect to the seat base and a center portion for engaging a floor of the vehicle and supporting the seat base when the seat base is located in the seating position, and wherein the biasing member is configured for biasing the leg member in the direction opposite the direction that the cable retracts the leg member.

14. The seat of claim 13 wherein the biasing member is a spring having a first end engaging the leg member and a second end engaging the seat base.

15. The seat of claim 13 wherein the biasing member is a spring having a first end engaging the leg member and a second end engaging the seat base; and wherein a first end of the cable is anchored and a second end of the cable is connected to the leg.

16. A seat for mounting in an automotive vehicle comprising:

a seat back for supporting an occupant and a seat base for supporting the occupant, the seat base being movable between a seating position in which the seat base is positioned generally horizontal, and a stow position in which the seat base is positioned generally vertical with the seat base facing the seat back;

a leg pivotably connected to the seat base for supporting the seat base when the seat base is located in the seating position, the leg comprising a U-shaped bent tube leg member having first and second ends and a center portion, the center portion of the leg for engaging a floor of the automotive vehicle;

a biasing member for biasing the leg in a first direction;

a cable assembly for automatically retracting the leg, the cable assembly having an anchored, first cable end and a connected, second cable end connected to move the leg in a direction opposite the first direction of the biasing member; and wherein the cable assembly is configured so that when the seat base moves from the seating position to the stow position, the leg is automatically retracted.

* * * * *